(12) United States Patent
Jin et al.

(10) Patent No.: US 6,678,014 B1
(45) Date of Patent: Jan. 13, 2004

(54) APPARATUS FOR AUTOMATICALLY SELECTING AUDIO SIGNAL OF DIGITAL TELEVISION

(75) Inventors: Sang Un Jin, Seoul (KR); Yong Hwan Wee, Seoul (KR)

(73) Assignee: LG Electronics Inc., Seoul (KR)

( * ) Notice: Subject to any disclaimer, the term of this patent is extended or adjusted under 35 U.S.C. 154(b) by 481 days.

(21) Appl. No.: 09/630,660

(22) Filed: Aug. 1, 2000

(30) Foreign Application Priority Data

Aug. 2, 1999 (KR) ......................................... 1999-31731

(51) Int. Cl.⁷ ........................... H04N 5/60; H04N 5/268
(52) U.S. Cl. ........................ 348/738; 348/706; 348/725
(58) Field of Search ................................ 348/738, 555, 348/556, 736, 705, 706, 737, 726, 727, 725, 14.11; 329/315, 345; 381/123, 120, 80, 81, 2, 3, 13, 77; H04N 5/44, 5/46, 5/268, 5/60

(56) References Cited

U.S. PATENT DOCUMENTS

| | | | |
|---|---|---|---|
| 3,636,380 A | * | 1/1972 | Anderson ..................... 327/205 |
| 5,453,796 A | * | 9/1995 | Duffield et al. .............. 348/565 |
| 5,461,427 A | * | 10/1995 | Duffield et al. .............. 348/555 |
| 5,510,858 A | * | 4/1996 | Shido et al. ................. 348/718 |
| 5,532,762 A | * | 7/1996 | Sakai et al. .................. 348/738 |
| 5,537,157 A | * | 7/1996 | Washino et al. ............. 348/722 |
| 5,822,425 A | * | 10/1998 | Ezaki et al. ................... 386/94 |
| 5,898,605 A | * | 4/1999 | Smarandoiu et al. ......... 365/45 |
| 6,272,176 B1 | * | 8/2001 | Srinivasan ................... 375/240 |

FOREIGN PATENT DOCUMENTS

EP     0240591     * 10/1987

* cited by examiner

*Primary Examiner*—Sherrie Hsia
(74) *Attorney, Agent, or Firm*—Birch, Stewart, Kolasch & Birch, LLP

(57) ABSTRACT

An apparatus for automatically selecting an audio signal of a digital television including: an amplifier for selectively receiving a digital audio signal among signals that are being outputted from at least two audio sources and amplifying it to a predetermined level; an integrating unit for detecting the level of the amplified signal and integrating it; and a controller for selecting a digital audio signal upon judgement that there is a digital audio signal if the integrated signal level is above a certain level, and outputting a control signal to select an analog audio signal upon judgement that there is no digital audio signal if the integrated signal level is below a certain level. With this construction, upon judgement whether there is a digital audio signal, if there is a signal, the digital audio signal is automatically received from a corresponding source, while, if there is no signal, an audio signal is received from other source, and whatever received is externally transmitted through an amplifier, thereby providing users with convenience in use.

14 Claims, 1 Drawing Sheet

FIG. 1
CONVENTIONAL ART
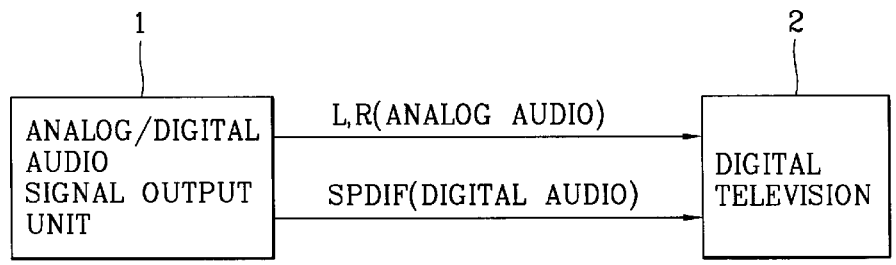
FIG. 2
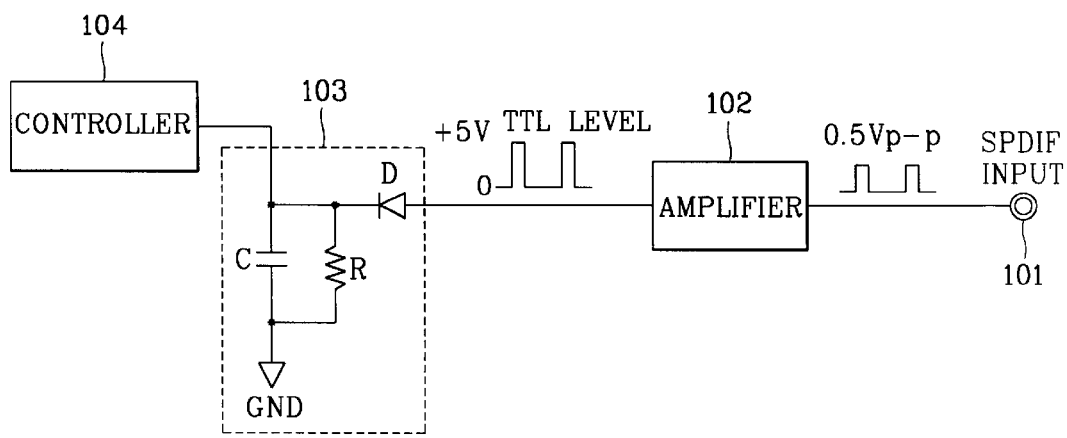
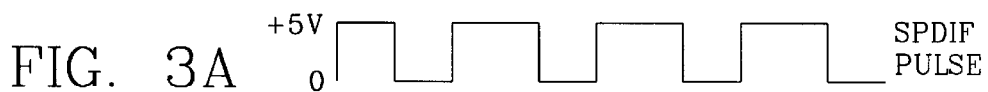
FIG. 3A
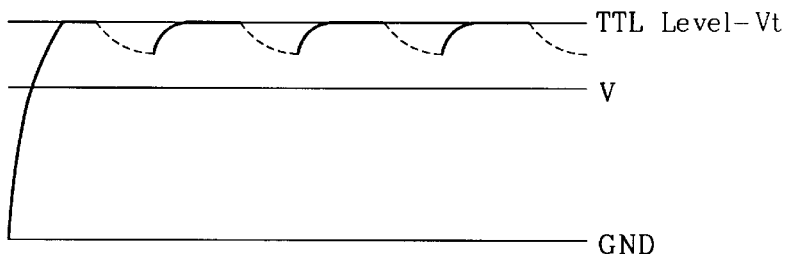
FIG. 3B

APPARATUS FOR AUTOMATICALLY SELECTING AUDIO SIGNAL OF DIGITAL TELEVISION

BACKGROUND OF THE INVENTION

1. Field of the Invention

The present invention relates to a digital television, and more particularly, to an apparatus for automatically selecting an audio signal of a digital television which is capable of performing automatic input switching between an analog audio signal and a digital audio signal that are being inputted to a digital television.

2. Description of the Background Art

A digital television is typically designed to receive a video signal and an audio signal from various external sources such as a DVD player, an HD-DBS (high definition directly broadcast by satellite), a VGA (video graphics array). Especially, in case of an audio system signal, an analog audio signal and a digital audio signal are simultaneously inputted to the digital television.

FIG. 1 is an exemplary view of an audio signal selection apparatus of a digital television in accordance with a conventional art, which includes an analog/digital audio signal output unit 1 for outputting an analog audio signal of an L,R (analog audio) or a digital audio signal of a SPDIF (Sony Phillips Digital InterFace); and a digital television 2 for selecting the analog audio signal or the digital audio signal outputted from the analog/digital audio signal output unit 1 according to the state of an Input jack of SPDIF and processing the selected one.

The operation of the audio signal selecting apparatus of the digital television in accordance with the conventional art constructed as described above will now be explained in detail with reference to the accompanying drawings.

First, the analog/digital audio signal output unit 1 receives the analog audio signal (L, R) from an analog instrument and outputs it to the digital television 2.

The analog/digital audio signal output unit 1 receives a digital audio signal from a digital instrument such as a DVD player, a HD-DBS or a computer sound card and outputs it to the digital television 2. In this respect, the digital audio signal inputted to the analog/digital audio signal output unit 1 is transmitted to the Input jack of SPDIF of the digital television 2 through the SPDIF output jack such as the DVD player, HD-DBS or the computer sound card and the plug.

As stated above, the digital television 2 simultaneously receives the analog audio signal and the digital audio signal.

Accordingly, there is provided a menu to an A/V amplifier (not shown) of the digital television for users' selection, from which a user can select either one of the analog audio signal and the digital audio signal for listening.

For example, when the user selects the analog audio signal, the digital television 2 receives and processes the analog audio signal, while if the user selects the digital audio signal, the digital television 2 receives and processes the digital audio signal.

In other way, the digital and the analog audio signal are processed in the following manner.

First, the digital television 2 checks the Input jack of SPDIF. Upon checking, in case that an RCA plug is put in the Input jack of SPDIF, the digital television 2 judges that a digital audio signal is being inputted, and automatically selects the digital audio signal to processes it. Meanwhile, if the RCA plug is not put in the Input jack of SPDIF, the digital television judges that an analog audio signal, rather than the digital audio signal, is being inputted, and automatically selects the analog audio signal to process it.

That is, it is mechanically judged that a plug is put in the input jack of the SPDIF and a high or a low voltage is transmitted to a CPU (not shown) of the digital television 2. Then, the CPU selects the digital audio signal as an input.

Likewise, whether or not the plug is in the Input jack of SPDIF is also mechanically judged and a low or a high voltage is transmitted to the CPU. Then, the CPU selects the analog audio signal as an input.

However, the audio signal selection apparatus of a digital television in accordance with a conventional art has the following problems.

First, since the judgement on whether the plug is put in the Input jack of SPDIF or not is made mechanically, even in case that no signal is inputted with the plug put in, the digital audio signal is selected and the user can not hear any sound.

Secondly, in a state that the plug is put in, if no digital audio signal is inputted, the plug that is put in the Input jack of SPDIF of the digital television must be removed in order for the user to hear the analog audio sound by the analog audio signal. Thus, this leads to a user's inconvenience for use by forcing him or her to remove the plug.

SUMMARY OF THE INVENTION

Therefore, an object of the present invention is to provide an apparatus for automatically selecting an audio signal of a digital television which is capable of automatically switching an analog audio signal and a digital audio signal that are inputted to a digital television, and its method.

Another object of the present invention is to provide an apparatus and method for selecting digital audio signals which overcome the problems and limitation of the conventional art. To achieve these and other advantages and in accordance with the purpose of the present invention, as embodied and broadly described herein, there is provided an apparatus for automatically selecting an audio signal of a digital television including: an amplifier for selectively receiving a digital audio signal among an analog audio signal and a digital audio signal that are being inputted, and amplifying it to a predetermined level; an integrating unit for detecting the level of the amplified signal and integrating it; and a controller for selecting a digital audio signal upon judgement that there is a digital audio signal if the integrated signal level is above a certain level, and outputting a control signal to select an analog audio signal upon judgement that there is no digital audio signal if the integrated signal level is below a certain level. As for the amplifier, an amplifier having a Schmitt-trigger characteristics is used.

In order to achieve the above objects, there is also provided a method for automatically selecting an audio signal of a digital television including the steps of: selectively receiving a digital audio signal among audio signals that are being inputted from at least two audio sources; integrating the digital audio signal as received and detecting its signal level; judging whether there is a digital audio signal according to the detected signal level; and performing automatic switching so that either one of the digital audio signal and the analog audio signal can be inputted depending on existence or nonexistence of the digital audio signal as judged.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a schematic view showing an audio signal selecting apparatus of a digital television in accordance with a conventional art;

FIG. 2 is a schematic view showing an apparatus for automatically selecting an audio signal of a digital television in accordance with an embodiment of the present invention; and FIGS. 3A and 3B illustrate voltage waveforms of both ends of a capacitor when there is a SPDIF input signal in the apparatus of FIG. 2 in accordance with an embodiment of the present invention.

DETAILED DESCRIPTION OF THE PREFERRED EMBODIMENTS

Reference will now be made in detail to the preferred embodiments of the present invention, examples of which are illustrated in the accompanying drawings.

As shown in FIG. 2, the apparatus for automatically selecting an audio signal of a digital television includes an audio signal input unit 101 for receiving a digital audio signal among an analog audio signal and a digital audio signal that are being inputted to a digital television; an amplifier 102 for amplifying the digital audio signal as received through the audio signal input unit 101 to a certain level; an integrating unit 103 for detecting the level of the signal amplified by the amplifier 102; and a controller 104 for generating a control signal to select a digital audio signal or an analog audio signal according to the signal level integrated by the integrating unit 103.

The amplifier 102 has Schmitt-trigger characteristics.

The integrating unit 103 includes a diode 'D', a resistor 'R' and a capacitor 'C'.

The operation of the apparatus for automatically selecting an audio signal of a digital television constructed as described above in accordance with the present invention will now be explained in detail with reference to the accompanying drawings.

First, the audio signal input unit 101 receives only a digital audio signal among a digital audio signal and an analog audio signal that are being inputted from at least two sources and transmits the digital audio signal to the amplifier 102.

In this respect, since the digital audio signal inputted through the audio signal input unit 101 has the small size of 0.5 Vp-p, a circuit is needed to amplify the digital audio signal to a TTL (transistor-transistor logic) level. To this need, the amplifier 102 amplifies the digital audio signal of 0.5 Vp-p level inputted through the audio signal input unit 101 to a TTL level of ge-g-g ?? 5 V, to output it. The TTL level outputted from the amplifier 102 is as shown in FIG. 3A.

As for the amplifier 102, in order to prevent a phenomenon that a noise component is amplified to be seen as if there exists a signal even though there is no digital audio signal, the amplifier has Schmitt triggering characteristics. That is, a Schmitt triggering amplifier is adopted for use in the present invention.

The integrating unit 103 receives the amplified signal from the amplifier 102, integrates it, and outputs the integrated value. In other words, in case that the amplified signal outputted from the amplifier 102 is of a high level, the diode 'D' of the integrating unit 103 is turned on and transmits the high level amplified signal to an RC circuit. At this time, the capacitor 'C' is changed.

In detail, in case that the signal amplified to a TTL level by the amplifier 102 is of high level, the voltage of TTL level—Vt is transmitted to the RC circuit. The voltage value of TTL—Vt is as shown in FIG. 3B. Here, Vt is a threshold voltage of the resistor 'R'.

For example, in case that a TTL level is of 5V, a value of 5V—Vt is transmitted to the RC circuit.

Meanwhile, the amplified signal outputted from the amplifier 102 is of a low level, the diode 'D' of the integrating unit 103 is turned off, and in this case, the current charged in the capacitor 'C' is discharged through the resistor 'R'.

The value of the capacitor 'C' is set to make its charging faster and its discharging slower, so that the capacitor 'C' is charged by more than a certain voltage level in case there exists a digital audio signal. For this purpose, the value of the capacitor 'C' is set by more than 10000 pF and the value of the resistor 'R' is set by more than 100 kΩ.

The controller 104 generates a control signal to select an analog audio signal or a digital audio signal depending on the integration result by the integrating unit 103. Namely, the controller 104 detects voltages of the both ends of the capacitor 'C' of the integrating unit 103 in a predetermined period.

With reference to FIGS. 3A and 3B, in case that the voltages of the both ends of the capacitor 'C' are above a certain value (V), the controller 104 judges that a digital audio signal is currently being inputted and generates a control signal to be transmitted to a CPU of the digital television to thereby select a digital audio signal, while in case that the voltages of the both ends of the capacitor 'C' are below a certain level (V), the controller 104 judges that no digital audio signal is being inputted and generates a control signal to be transmitted to the CPU of the digital television to select an analog audio signal.

In this manner, the digital audio signal and an analog audio signal are automatically switched.

Resultantly, upon judgement of the level of the digital audio signal, if the level of the digital audio signal is above certain level, the digital audio signal is selected, while, if the level of the digital audio signal is below a certain level, the analog audio signal is selected to be processed.

A method for automatically selecting an audio signal of a digital television in accordance with the present invention includes steps of receiving a digital audio signal among audio signals that are being inputted from at least two audio sources; integrating the digital audio signal as received and detecting its signal level; judging whether there is a digital audio signal depending on the detected signal level; and performing automatic switching so that one of the digital audio signal and the analog audio signal can be inputted depending on the existence or nonexistence of the digital audio signal as judged.

As so far described, the present invention has the following effects.

First, upon judgement whether there is a digital audio signal, if there is a signal, the digital audio signal is automatically received from a corresponding source, while, if there is no signal, an audio signal is received from another source. Whatever received is externally transmitted through an amplifier, thereby providing users with convenience in use.

Secondly, the phenomenon that noise component is amplified to be seen as if there existed a signal in case that there is no signal in detecting a signal is removed by using the Schmitt-triggering characteristics, so that a possible malfunction of an instrument can be prevented.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. An apparatus for automatically selecting an audio signal of a digital television, comprising:
    an audio signal input unit for selectively receiving a digital audio signal among a digital audio signal and an analog audio signal that are being inputted from at least two audio sources to the digital television;
    an integrating unit for detecting the level of the digital audio signal as received through the audio signal input unit and integrating the level of the digital audio signal; and
    a controller for generating a control signal to perform automatic switching so as for the digital audio signal to be inputted in case that the level of the signal integrated by the integrating unit is above a predetermined value, while to perform automatic switching so as for the analog audio signal to be inputted in case that the level of the signal integrated by the integrating unit is below a predetermined value.

2. The apparatus according to claim 1 further comprising: an amplifier for amplifying the digital audio signal inputted through the audio signal input unit to a TTL (transistor-transistor logic) level.

3. The apparatus according to claim 2, wherein the amplifier is a Schmitt-triggering amplifier having Schmitt-triggering characteristics.

4. The apparatus according to claim 1, wherein the integrating unit includes an RC (resistor-capacitor) circuit.

5. The apparatus according to claim 4, wherein the integrating unit sets a value for the capacitor to make its charging faster and its discharging slower.

6. The apparatus according to claim 1, wherein the controller outputs the control signal to a CPU of the digital television to perform the automatic switching.

7. The apparatus according to claim 1, wherein the predetermined values are the same.

8. A method for automatically selecting an audio signal of a digital television, the method comprising the steps of:
    receiving a digital audio signal among audio signals that are being inputted from at least two audio sources;
    integrating the received digital audio signal and detecting its signal level;
    judging whether or not there is a digital audio signal depending on the detected signal level; and
    performing automatic switching so that either one of the digital audio signal and the analog audio signal can be inputted depending on existence or nonexistence of the digital audio signal as judged in the judging step.

9. The method according to claim 8, wherein in the step of judging whether or not there is a digital audio signal depending on the detected signal level, it is judged that there is a digital audio signal if the signal level is above a predetermined value, while it is judged that there is no digital audio signal if the signal level is below a predetermined value.

10. The method according to claim 9, wherein the predetermined values are the same.

11. The method according to claim 8, further comprising:
    amplifying the received digital audio signal before the integrating step.

12. The method according to claim 11, wherein the amplifying step amplifies the received digital audio signal to a TTL (transistor-transistor logic) level.

13. The method according to claim 8, wherein the performing step includes:
    generating a control signal based on the results of the judging step; and
    outputting the control signal to a CPU of the digital television.

14. An apparatus for automatically selecting an audio signal of a digital television, comprising:
    an audio signal input unit for selectively receiving a digital audio signal among a digital audio signal and an analog audio signal that are being inputted from at least two audio sources to the digital television;
    an integrating unit for detecting the level of the digital audio signal as received through the audio signal input unit and integrating the level of the digital audio signal; and
    a controller for generating a control signal to perform automatic switching so as for the digital audio signal to be inputted in case that the level of the signal integrated by the integrating unit is above a predetermined value, while to perform automatic switching so as for the analog audio signal to be inputted in case that the level of the signal integrated by the integrating unit is below a predetermined value,
    wherein the integrating unit sets a value for a capacitor to make its charging faster and its discharging slower.

* * * * *